May 11, 1943.　　　　G. V. NOLDE　　　　2,319,153
TRAFFIC COUNTER
Filed April 12, 1940　　　3 Sheets-Sheet 1
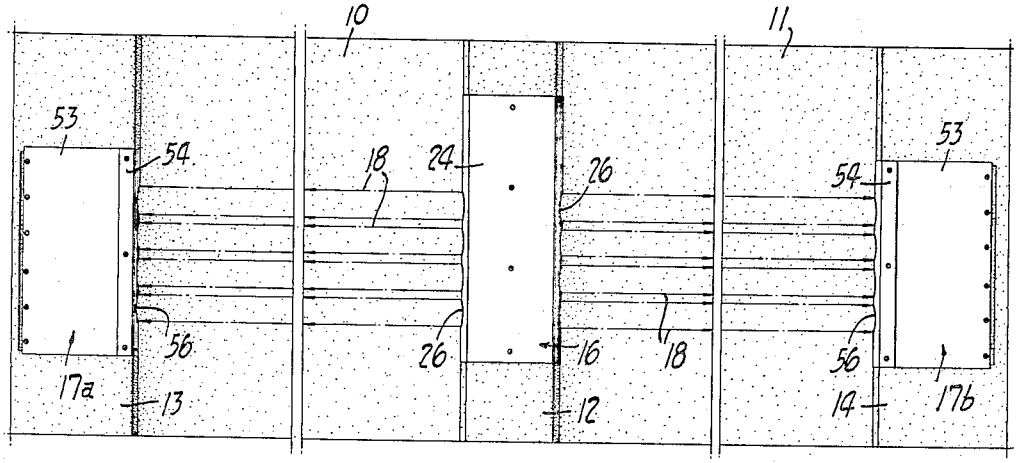
FIG_1_
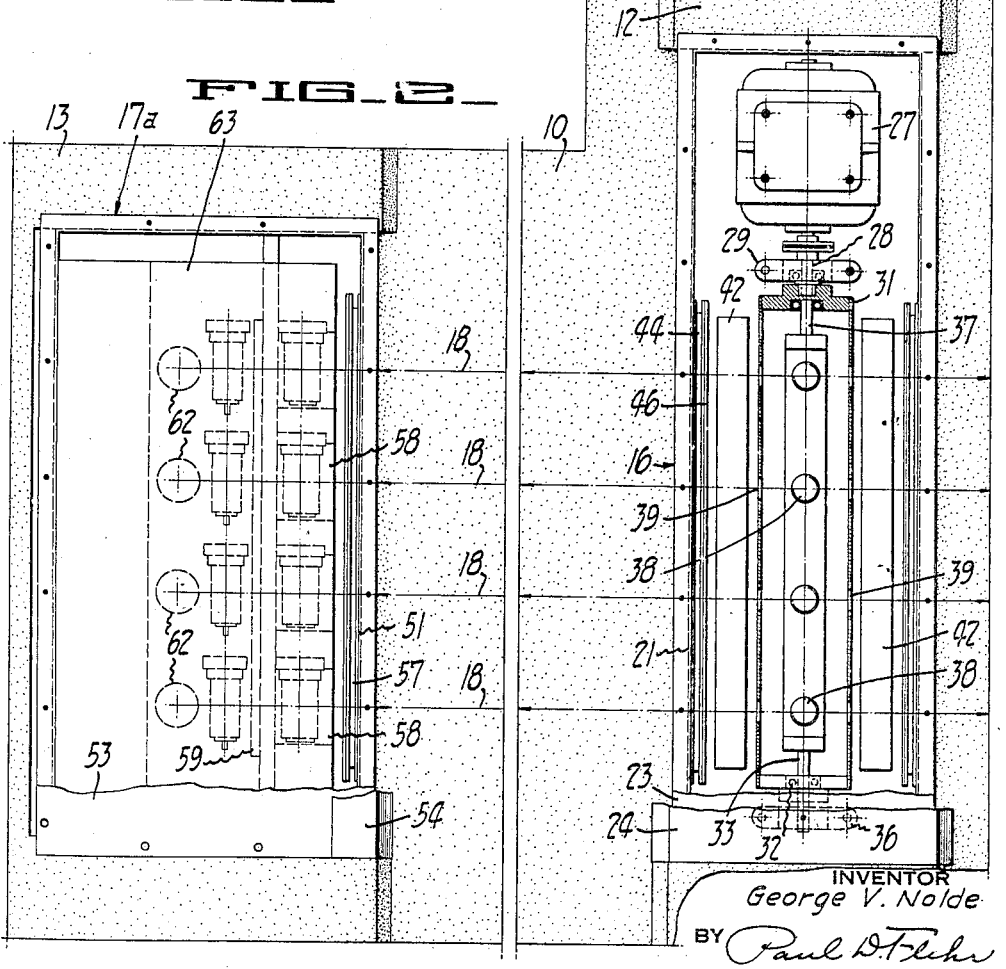
FIG_2_
INVENTOR
George V. Nolde
BY Paul D. Flehr
ATTORNEY May 11, 1943. G. V. NOLDE 2,319,153
TRAFFIC COUNTER
Filed April 12, 1940 3 Sheets-Sheet 2

INVENTOR
George V. Nolde
BY Paul O. Fleher
ATTORNEY

May 11, 1943.                   G. V. NOLDE                    2,319,153
                               TRAFFIC COUNTER
                           Filed April 12, 1940            3 Sheets-Sheet 3
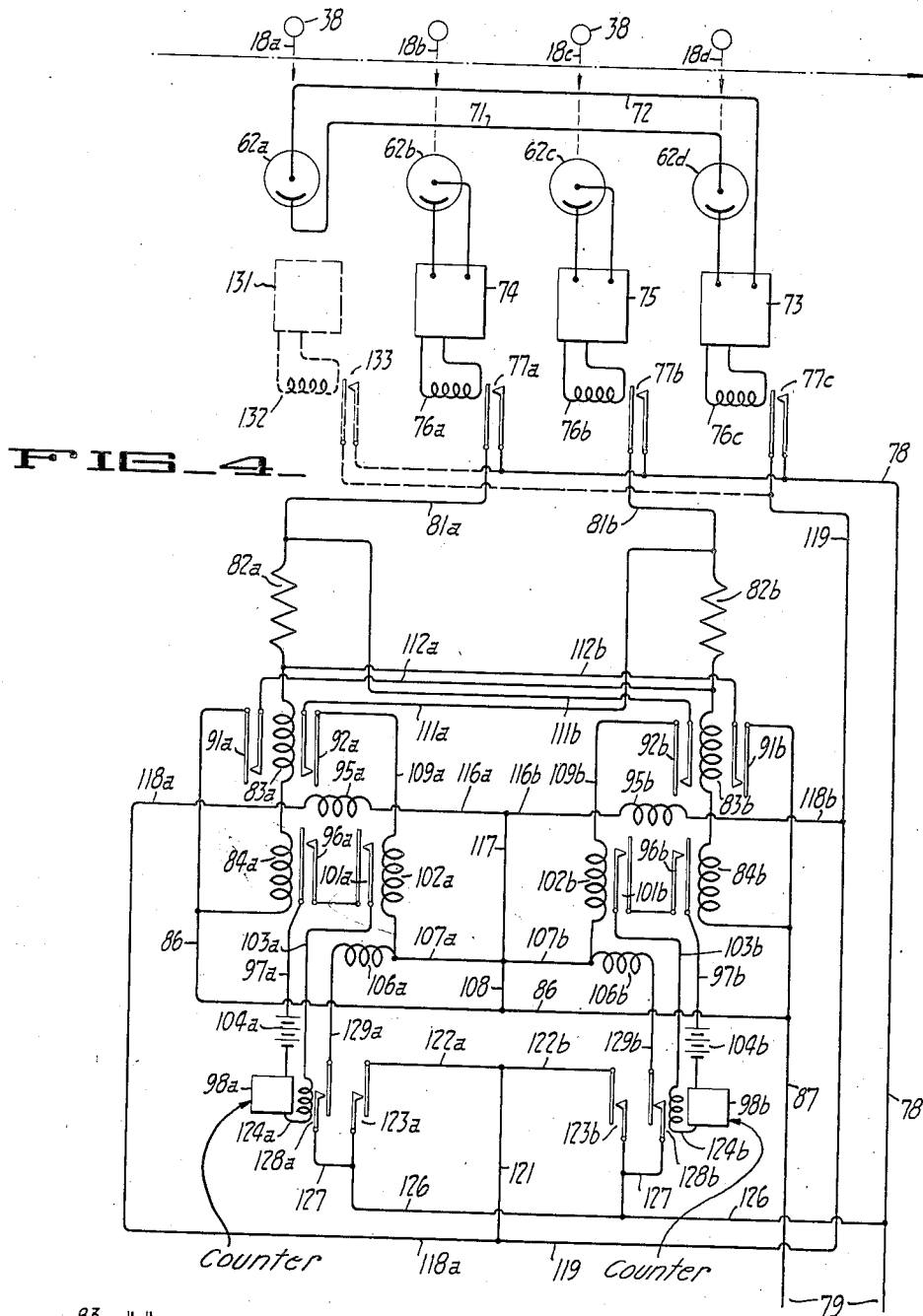
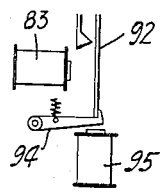
INVENTOR
George V. Nolde
BY
Paul D. Flehr
ATTORNEY Patented May 11, 1943

2,319,153

UNITED STATES PATENT OFFICE 2,319,153

TRAFFIC COUNTER

George V. Nolde, San Francisco, Calif., assignor to Butte Electric Manufacturing Co., San Francisco, Calif., a corporation of California Application April 12, 1940, Serial No. 329,283

4 Claims. (Cl. 235—92)

This invention is concerned primarily with counting apparatus and relates more particularly to an improved apparatus for counting vehicular traffic and the like.

Various forms of traffic counters have been heretofore proposed, for example one having a plurality of treadle-actuated switches which is responsive to concurrent sequential actuation of certain of the switches. With this form of counter inaccurate counts have been caused because the counter is not responsive to small vehicles such as motorcycles, for example, which do not operate the treadle concurrently either because of improper spacing or because of bouncing of a wheel so that an inaccurate count is recorded.

Other forms of proposed traffic counters using photoelectric cells and constant beams of light which impinge upon the cells, except when interrupted by a passing vehicle, have also been found to produce inaccurate counts, principally because of various factors.

One of these factors is reflection of light from different colored vehicles or tires which affects the photoelectric relay giving the effect of a non-interrupted light beam or a double-interruption and causing an entire miss or producing double counts. Also the level of outside illumination changes from morning to night, making it necessary to readjust a constant beam photoelectric system frequently as to its sensitivity. Further it has been found that humidity and temperature changes affect the insulation condition of the cable connecting the photoelectric cells to the input of the amplifier and such changes in insulation condition may shunt the input and produce misoperation of the apparatus. Where this condition has been corrected in such apparatus expensive packing and insulating of all leads, plugs etc. have been necessary. For the above reasons photoelectric traffic counters have not been generally used and have been generally considered to be unsatisfactory.

In accordance with the instant invention, a traffic counting apparatus is provided which is free of the defects noted above and which is not affected by difference in the color of passing vehicles, by temperature or humidity changes, or by the level of outside illumination. Further the apparatus is responsive equally to light and heavy vehicles and will not give a false count from this viewpoint.

It is a general object of the invention, therefore, to provide an accurate and reliable counter for traffic or the like.

Another object of the invention is to provide an improved traffic counter in which false counts from uncontrolled causes are eliminated.

Another object of the invention is to provide a traffic counter which will prevent repeated actuation of the counter so as to cause an incorrect registration if a vehicle moves back and forth in front of the apparatus.

Another object of the invention is to provide a traffic counter which can be used selectively for either direction of traffic without special adjustment.

Other objects and advantages of the invention will be apparent from the following description of a preferred embodiment thereof as disclosed in the accompanying drawings, in which:

Fig. 1 is a plan view of a two-lane installation embodying the instant invention, as for example in a toll gate or toll road installation.

Fig. 2 is an enlarged plan view of the counting apparatus with certain of the parts shown diagrammatically, and also shows a plan view of the light producing unit of the counter with the casing broken away to disclose the construction more clearly.

Fig. 4 is a circuit diagram of the electrical connections.

Fig. 5 is a detailed schematic view of a locking type of relay.

Figure 3:
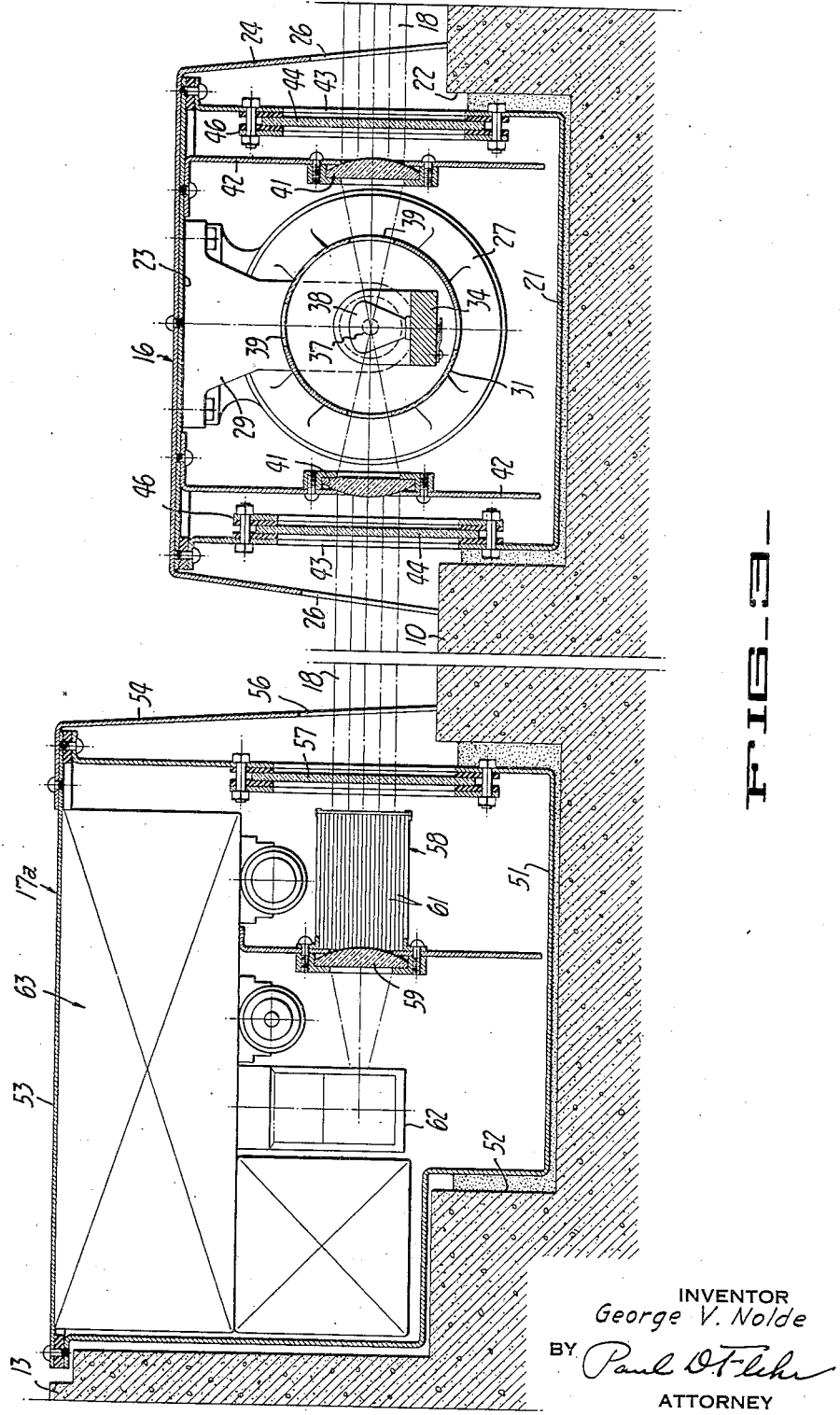
Fig. 3 is an enlarged sectional view of both the light unit and the counting unit of the system.

As previously stated the instant invention is shown and described in connection with a typical installation for counting the vehicular traffic passing in the various lanes of a toll station, which, referring to Fig. 1, may include a pair of parallel lanes 10 and 11 for traffic in either direction as traffic conditions may require. The lanes 10 and 11 are separated by a central curb 12 and have side curbs 13 and 14, respectively. In the central curb a light source unit 16 is provided which is adapted for cooperation with a pair of counting units 17a and 17b mounted in the respective curbs 13 and 14. As shown the light source 16 emits four parallel beams 18 to either side for cooperation with respective counting units 17a and 17b. As shown in Fig. 3, the beams 18 are closely adjacent the road surface so that they will be intercepted by the lowermost portion of the tire which is in engagement with the road surface.

*Light source unit.*—Referring to Figs. 2 and 3, the light source unit includes a casing 21 which may be mounted in a recessed portion 22 of the roadway between adjacent portions of the center curb 12. The casing 21 is provided with a top plate 23 suitably secured to the U-shaped body of the casing and has an inverted U-shaped cover 24 secured thereover. As shown, the cover 24 conforms to the lines of the curb 12 and is provided with a series of apertures 26, through which the light beams 18 may pass. An electric motor 27 of suitable construction depends from the top plate 23 adjacent one end thereof and is connected by shaft 28 (Fig. 2) journalled in bearing 29 to a cylinder 31 which as later described forms part of a light modulating system. At its opposite end the cylinder 31 is journalled by a bearing 32 upon a stationary shaft extension 33 of a lamp bracket 34. The shaft extension 33 extends through bearing 32 and is supported by a bracket 36 depending from top plate 23. Adjacent motor 27 bracket 34 is supported by shaft extension 37 journalled by a suitable bearing in cylinder 31. Bracket 34 provides a mounting for four lamps which may be in the form of electric lights 38 which are mounted at equally spaced positions therealong, so as to produce the four beams of light 18.

In accordance with the instant invention these beams of light are of a special character to provide certain advantageous results as noted, and each beam of light is preferably modulated. For this purpose the cylinder 31 is provided with a series of holes 39 about each lamp 38 so that when the device is operating and the cylinder 31 is rotating a chopped light beam is produced. Preferably, the number of apertures in cylinder 31 and its rate of rotation may be controlled to provide a light frequency of from 25 to 40 per second. Preferably each light beam is made up of a pencil of parallel rays, and for this purpose on either side of each lamp 38 a plano-convex lens 41 is mounted by a suitable fitting upon a plate 42 depending from top plate 23. Adjacent the row of lenses 41 the side wall of the casing is apertured as at 43 and a pane of glass 44 is mounted thereon as by brackets 46.

From the foregoing description it will be seen that the light source provides four beams of modulated light transverse to and spaced along the direction of travel of the traffic.

*Counting unit.*—The counting units 17a and 17b, shown in Fig. 1, are identical in construction and the unit 17a will be hereinafter referred to. Unit 17a includes a casing 51 which is seated in a recessed portion 52 of the curb 13 and is provided with a removable top plate 53 and a depending guard 54 across the side thereof facing the light source unit which is apertured as at 56 to permit passage of the beams 18. A side opening in the wall of casing 51 is closed by a pane 57 through which the light beam is transmitted to a special receiving visor 58 in front of a lens 59. The visor 58 is made up of a series of nested tubes 61 which are spaced closely together so as to prevent transmission of any except parallel rays of light.

The lens 59 serves to receive the parallel light beams and to focus such beams upon a photoelectric cell 62 of conventional construction which depends from the relay box 63.

From the foregoing it will be seen that the respective modulated light beams 18 projected from one side of light unit 16 are received, unless interrupted, by an equal number of lenses and are focused upon four photoelectric cells.

*Counter circuit.*—The circuit which is controlled by the light beams referred to above is illustrated more or less schematically in Fig. 4 where the four photoelectric cells are indicated at 62a and 62d, inclusive. In general the photoelectric cells 62a and 62d are conditioning units and serve to insure the proper conditioning of all portions of the circuit for counting operations, while the photoelectric cells 62b and 62c control the actual counting operation in accordance with the sequential operation thereof, although the control may be concurrent without causing a false count.

The photoelectric cells 62a and 62d are connected in series by leads 71 and 72 and are also connected thereby to an amplifier 73 of conventional construction and of the type which is responsive only to alternating current or to modulated current. In other words, the output circuit of amplifier 73 will not respond to a direct current input. Similar amplifiers 74 and 75 are associated with the photoelectric cells 62b and 62c respectively.

Associated with the output circuit of the amplifiers 73 to 75 are a plurality of relays 76a, 76b, and 76c respectively having respective normally closed contacts 77a, 77b, and 77c associated therewith. Thus contacts close only when the associated solenoid is de-energized, that is when the associated modulated light beam is interrupted, but are ordinarily held open by the energization of the solenoids 76a to 76c inclusive. The solenoids are sufficiently slow acting so that they are maintained energized by successive impulses of the modulated light beams.

The circuit as shown includes two similar but innerconnected counting systems, which are operated solely in response to the sequence of operation of the four photoelectric cells 62a to 62d. As shown one side of each of contacts 77a, 77b and 77c are connected to lead 78 which may form the positive side of the input line 79. The input may be either alternating current or direct current. The other sides of contacts 77a and 77b are connected by respective leads 81a, 81b with respective resistors 82a and 82b. In series with resistor 82a are a pair of relays 83a, 84a, while relays 83b and 84b are in the series with resistor 82b. From relay 84a, lead 86 extends to negative lead 87 of the line to which the relay 84b is also connected.

Associated with the relay 83a are two pair of normally open contacts 91a and 92a, while the relay 83b has two pair of similar contacts 91b and 92b associated therewith. The contacts 91a, 91b, and 92a, 92b may be of the type shown in Fig. 5 wherein the armature 92 is provided with a mechanical lock 94 which is spring urged to active position to lock the contacts in closed position and may be released upon the energization of the associated solenoid 95. Solenoid 83 is the control solenoid for armature 92. The releasing solenoid for the armatures of contact 91a, 92a is indicated at 95a in Fig. 4, and that for the armatures of contact 91b and 92b is indicated at 95b.

The relay 84a has contacts 96a of the normally closed type. One contact 96a is connected by lead 97a with electrically-actuated counter 98a of conventional construction and the other contact 96a is connected with contacts 101a of a relay 102a. The contacts 101a are connected in series with counter 98a by lead 103a. Similarly, relay 84b has one of its contacts 96b connected by lead 97b with counter 98b and the other connected with contacts 101b of a relay 102b, contacts 101b also being connected by lead 103b with counter 98b. The circuits for counters 98a and 98b also include sources of current indicated at 104a and 104b, respectively. Contacts 101a and 101b are of the normally open locking type which are locked in closed position and have respective releasing solenoids 106a and 106b associated therewith.

The relays 102a, 102b, 106a, 106b are connected by respective leads 107a, 107b, and common lead 108 with lead 86 extending to the negative side 87 of the line. At their opposite ends, relays 102a, 102b are connected in series by respective leads 109a, 109b, with the respective contacts 92a and 92b which in turn are connected by respective leads 111a and 111b with leads 81a and 81b ahead of the resistors 82a and 82b. The respective contacts 91a and 91b are also connected by respective leads 112a and 112b between resistor 82a and relay 83a, and resistor 82b and relay 83b, respectively.

The releasing solenoids 95a and 95b are connected at one side by leads 116a, 116b, 117 and 108 to lead 86 and thence to lead 87 of the line, and at the other side by respective leads 118a and 118b with lead 119 extending to one side of contact 77c. The lead 119 is also connected by leads 121 and 122a, 122b with respective pairs of normally open contacts 123a and 123b of the relays 124a, 124b in series in the circuit of the counters 98a and 98b. The other side of contacts 123a and 123b are connected by lead 126 to the positive lead 78 of the line. Also associated with the solenoids 124a and 124b are two pair of normally open contacts 128a and 128b which are connected to the line by lead 127 and at their other sides are connected by leads 129a and 129b with the releasing solenoids 106a and 106b.

It is thought that the circuit can best be understood with reference to a description of its operation which will now be given.

Assuming that a vehicle is passing from left to right, as viewed in Fig. 4 as indicated by the arrow, so that the vehicle tire will interrupt the light beams 18a, 18b, 18c and 18d in succession the following described operations will take place.

Interruption of beam 18a interrupts the current to amplifier 73 and relay 76c so that contacts 77c are closed. This completes the circuit from the lead 78 of the line through contacts 77c and lead 119 through two paths. One of these paths is through lead 118b, releasing solenoid 95b, leads 116b, 117, 108, and 86 to the opposite side 87 of the line so that the releasing solenoid 95b is operated. The contacts 91b and 92b, if previously locked in closed position, will be opened. The other path is through lead 119, 118a to the solenoid 95a and thence through leads 116a, 117, 108 and 86 to the lead 87. This operates the solenoid 95a which releases the contacts 91a and 92a, if they have been previously locked in from accidental causes, as will be later described.

When the vehicle tire interrupts the beam 18b so that the photoelectric cell 62b and amplifier 74 are deenergized together with the relay 76a, the contacts 77a will close to complete the circuit from the lead 78 of the line to lead 81a. From lead 81a the current cannot flow through lead 111b because contacts 92b are open, therefore the current proceeds through the resistor 82a and from the resistor it cannot flow through the lead 112b because the contacts 91b are open. Thus the current flows through the relays 83a, 84a and lead 86 back to the other lead 87 of the line. The energization of solenoid 83a closes contact 91a and 92a which are locked in closed position. At the same time relay 84a opens contacts 96a which only remain closed as long as current is established through the resistor 82a and relay 84a because of the interruption of the light beam to the photoelectric cell 62b. The opening of the contacts 96a prevents energization of the counter 98a prematurely.

The closing of contacts 91a establishes a shunt circuit through the lead 112a ahead of the relays 83b and 84b so that an operative circuit thereto will not be established upon subsequent closing of contacts 77b. Also the closing of contacts 92a prepares a circuit through the lead 81b, lead 111a, contact 92a, lead 109a, relay 102a, and leads 107a, 108 and 86 back to the lead 87 of the line.

If the vehicle tire subsequently interrupts the beam 18c so that current no longer flows through photoelectric cell 62c and amplifier 75, relay 76b is deenergized and contacts 77b are closed to establish a circuit from lead 78 of the line through contacts 77b to lead 81b where two parallel branches are available as above described. Because of the resistor 82b and the shunt circuit through lead 112a, contacts 91a and lead 86, insufficient current will flow through relays 83b and 84b for operation thereof. Current in the circuit established by contacts 77b, therefore flows through the lead 111a, contacts 92a, lead 109a, relay 102a, and leads 107a, 108 and 86 back to lead 87 of the line. The energization of relay 102a closes the contacts 101a which are locked in closed condition to prepare the counter circuit for a count on the counter 98a when the contacts 96a are closed. Such closing of contacts 96a occurs when the beam 18b is again effective on the photoelectric cell 62b so that the amplifier 74 energizes the relay 76a and opens the contacts 77a to de-energize the relay 84a.

When the counter 98a is operated as a result of the sequential interruption and re-establishing of the beams 18b and 18c, although both may be energized at the same time, counter solenoid 124a operates to close both sets of contacts 128a and 123a. When the contacts are closed a circuit is established from lead 78 of the line through leads 126, contacts 128a, lead 129a, solenoid 106a and leads 107a, 108 and 86 back to the other side 87 of the line. This serves to unlock the contacts 101a of the relay 102a to insure only a single count and immediately reconditions these contacts for subsequent operation for another registration. Also, a circuit is established through lead 126, contacts 123a, leads 122a, 121, 118a, solenoid 95a, and leads 116a, 117, 108 and 86 to the lead 87 of the line so that contacts 91a and 92a are unlocked. These re-conditioning circuits insure normalizing of contacts 101a, 91a and 92a after a count is made so that the entire circuit is ready for a subsequent count in either direction. For example, if a vehicle should stop, with its tire intercepting beam 18c only after movement in the direction noted, and should roll back, a count would be registered on counter 98b as will be described.

Subsequently as the beam 18d is interrupted and the amplifier 73 and relay 76c are de-energized so that contacts 77c are closed, a circuit is established from lead 78 of the line through contacts 77c and lead 119 which branches, one branch extending through lead 118b through relay 95b to unlock contacts 91b and 92b, and leads 116b, 117, 108 and 86. The other branch being through lead 118a, to relay 95a, leads 116a and 117 then through leads 108 and 86 back to the other side 87 of the line. Thus all of the locked contacts are released as the final step in making a count, irrespective of whether the vehicle stops in a beam interrupting position or not.

The operation in case the vehicle passes from right to left as viewed in Fig. 4 is similar to that described, but the closing of contacts 77b conditions the circuit for counter 98b, which is operated when the contacts 77a are closed and the contacts 77b opened.

It is desirable to have the counters 98a and 98b in the same circuit in the event a vehicle tire travels in one direction past the beams 18a to 18d, and then for some reasons is backed through the beams again. In this situation a count is made for each sequential interruption of beams 18b and 18c in either direction, so that at the end of a period of operation the difference in the readings of counters 98a and 98b can be taken as the correct count for the number of wheels which have passed by the counting apparatus. In addition the circuit as described enables the counting of traffic in either direction through the same lane in accordance with traffic conditions without special adjustment.

While the counting circuit has been shown under control of photoelectric cells and light beams it may be used with other types of electrical energizing impulses and when this is effected it is usually desirable to provide an additional amplifier 131 as indicated in dotted lines in Fig. 4 having a relay 132 and contacts 133 associated therewith. This amplifier and relay are controlled by suitable energizing means, as for example, photoelectric cell 62a, and the contacts 133 may be connected in parallel with the contacts 77c. The operation is similar except that the initial and final normalizing operations may be tripped independently from separate electrical sources.

I claim:

1. In a system for counting traffic or the like, a counter, a counter circuit, said circuit including normally closed contacts and normally open contacts, a counter controlling circuit including means for closing said normally open contacts and including another set of normally open contacts, a preparing circuit for closing said normally open contacts of said counter controlling circuit, said preparing circuit also including means for opening said normally closed contacts of said counter circuit, locking means associated with each set of normally open contacts to lock said contacts in closed condition, upon closing thereof, and means disposed in the path of traffic flow for first disabling said locking means, then enabling said preparing circuit, for subsequently enabling said counter controlling circuit, and for thereafter again disabling said locking means.

2. In a traffic counting system for counting traffic in a traffic lane, means including at least four control devices actuated by the passage of a vehicle in said lane, said devices being spaced apart in the direction of travel, a pair of counting devices adapted to be electrically operated, one counting device serving to count traffic in one direction and the other counting device serving to count traffic in the other direction, a circuit network connected to all of said devices and comprising means responsive to actuation of either of the outer control devices for conditioning said circuit network for operating both of said counting devices, and means responsive to seriatim actuation of the intermediate control devices in one direction for operating one of said counters and to seriatim actuation of said intermediate control devices in the other direction for operating the other of said counters.

3. In a traffic counting system for counting traffic in a traffic lane, means on one side of said lane forming at least four light beams directed across said lane, and displaced apart in the direction of travel, a light responsive device individual to each of said beams disposed on the other side of said lane to receive light from said beams, a pair of counting devices adapted to be electrically operated, one device serving to count traffic in one direction and the other device serving to count traffic in the other direction, a circuit network connected to all of said devices and comprising, means responsive to a traffic interruption of either of the outer light beams for conditioning said circuit network for operating both of said counting devices, and means responsive to seriatim traffic interruption of the intermediate light beams in one direction for operating one of said counters and to seriatim traffic interruption of said intermediate light beams in the other direction for operating the other of said counters.

4. In a traffic counting system as in claim 3, in which said network comprises primary relays connected to the light responsive devices receiving said intermediate beams and operated by traffic interruption of the light beams corresponding to the same, secondary self-locking relays connected to be operated by said primary relays and adapted to selectively control the operation of said counters, and means responsive to interruption of either of the outer light beams received by the other two light responsive devices for unlocking said self-locking relays, thus conditioning the same for subsequent operation.

GEORGE V. NOLDE.